(12) United States Patent
Saito

(10) Patent No.: US 11,979,541 B2
(45) Date of Patent: May 7, 2024

(54) SERVER AND NON-TRANSITORY COMPUTER-READABLE RECORDING MEDIUM FOR COMMUNICATION SYSTEM INCLUDING AN ADMINISTRATOR'S DEVICE, A TERMINAL DEVICE, A COMMUNICATION DEVICE, AND A CONTROLLER HAVING HARDWARE

(71) Applicant: Brother Kogyo Kabushiki Kaisha, Nagoya (JP)

(72) Inventor: Ken Saito, Tokoname (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/163,909

(22) Filed: Feb. 3, 2023

(65) Prior Publication Data

US 2023/0269341 A1 Aug. 24, 2023

(30) Foreign Application Priority Data

Feb. 22, 2022 (JP) .................................. 2022-026136

(51) Int. Cl.
*H04N 1/00* (2006.01)
*H04L 9/40* (2022.01)
*H04N 1/44* (2006.01)

(52) U.S. Cl.
CPC ....... *H04N 1/4433* (2013.01); *H04L 63/0876* (2013.01); *H04N 1/00244* (2013.01); *H04N 1/00344* (2013.01); *H04N 1/4413* (2013.01)

(58) Field of Classification Search
CPC ............. H04N 1/4433; H04N 1/00244; H04N 1/00344; H04N 1/4413; H04L 63/0876
See application file for complete search history.

(56) References Cited

U.S. PATENT DOCUMENTS

| | | | |
|---|---|---|---|
| 11,082,524 B2 * | 8/2021 | Matsushima | ......... H04L 67/303 |
| 2015/0040188 A1 * | 2/2015 | Takeuchi | ................ H04L 63/08 726/3 |

(Continued)

FOREIGN PATENT DOCUMENTS

JP 2016-193592 A 11/2016

*Primary Examiner* — Juan M Guillermety
(74) *Attorney, Agent, or Firm* — KENEALY VAIDYA LLP

(57) ABSTRACT

A server is configured to perform obtaining a first request for information associated with an administrator of a communication device from an administrator's device, transmitting management information associated with the administrator to a management device in response to the first request, obtaining an information request for information to be used by the communication device therefrom, transmitting authentication information to use the communication device thereto, obtaining the authentication information and the management information from the terminal device, the authentication information obtained from the terminal device being information transmitted by the terminal device based on the authentication information received by the communication device, the management information obtained from the terminal device being information to be transmitted by the terminal device based on the management information received by the management device, and associating the management information obtained from the terminal device with identification information of the communication device.

7 Claims, 7 Drawing Sheets

(56) References Cited

U.S. PATENT DOCUMENTS

2015/0229520 A1\* 8/2015 Ichikawa ................ H04L 67/10
709/222
2016/0292550 A1 10/2016 Kawai \* cited by examiner

| 631 | SUBSCRIBER IDENTIFIER LID | PASSWORD PW | REGISTRATION IDENTIFIER CID | SUBSCRIPTION IDENTIFIER ZID | MANAGEMENT IDENTIFIER UID |
|---|---|---|---|---|---|
| | LID1 | PW1 | CID1 | ZID1 | CID1 |
| | ⋮ | ⋮ | ⋮ | ⋮ | ⋮ |

FIG. 2A

| 632 | SUBSCRIPTION IDENTIFIER ZID | PLAN PL | DEVICE IDENTIFIER DID | DELIVERY DESTINATION ADR |
|---|---|---|---|---|
| | ZID1 | PL1 | DID1 | ADR1 |
| | ZID1 | PL1 | DID2 | ADR2 |
| | ⋮ | ⋮ | ⋮ | ⋮ |

FIG. 2B

| 531 | REGISTRATION IDENTIFIER CID | DEVICE IDENTIFIER DID |
|---|---|---|
| | CID1 | DID1 |
| | CID1 | DID2 |
| | ⋮ | ⋮ |

FIG. 2C

| 532 | ONE-TIME CODE OTC | DEVICE IDENTIFIER DID | REGISTRATION DATE & TIME RT |
|---|---|---|---|
| | OTC1 | DID3 | 2021-11-16 17:14:00 → TERM T (e.g., T = RT + dT) |

FIG. 6A

| 632 | SUBSCRIPTION ZID | PLAN PL | DEVICE IDENTIFIER DID | DELIVERY DESTINATION ADR |
|---|---|---|---|---|
| | ZID1 | PL1 | DID1 | ADR1 |
| | ZID1 | PL1 | DID2 | ADR2 |
| R1 → | ZID1 | PL1 | DID3 | ADR3 |
| | ⋮ | ⋮ | ⋮ | ⋮ |

FIG. 6B

| 531 | REGISTRATION IDENTIFIER CID | DEVICE IDENTIFIER DID |
|---|---|---|
| | CID1 | DID1 |
| | CID1 | DID2 |
| R2 → | CID1 | DID3 |
| | ⋮ | ⋮ |

FIG. 6C

| ONE-TIME CODE OTC | DEVICE IDENTIFIER DID | REGISTRATION DATE & TIME RT | |
|---|---|---|---|
| OTCa | DID3 | RTa 2021-11-16 17:14:00 | → TERM Ta (e.g., Ta = RTa + dT) |
| OTCb | DID4 | RTb 2021-11-16 19:23:34 | → TERM Tb (e.g., Tb = RTb + dT) |

| SUBSCRIPTION IDENTIFIER ZID | PLAN PL | DEVICE IDENTIFIER DID | DELIVERY DESTINATION ADR |
|---|---|---|---|
| ZID1 | PL1 | DID1 | ADR1 |
| ZID1 | PL1 | DID2 | ADR2 |
| ZID1 | PL1 | DIDa | ADRa |
| ZID1 | PL1 | DIDb | ADRb |
| ⋮ | ⋮ | ⋮ | ⋮ |

632

R1a → (row 3), R1b → (row 4)

FIG. 7B

| REGISTRATION IDENTIFIER CID | DEVICE IDENTIFIER DID |
|---|---|
| CID1 | DID1 |
| CID1 | DID2 |
| CID1 | DIDa |
| CID1 | DIDb |
| ⋮ | ⋮ |

531

R2a → (row 3), R2b → (row 4)

SERVER AND NON-TRANSITORY COMPUTER-READABLE RECORDING MEDIUM FOR COMMUNICATION SYSTEM INCLUDING AN ADMINISTRATOR'S DEVICE, A TERMINAL DEVICE, A COMMUNICATION DEVICE, AND A CONTROLLER HAVING HARDWARE

REFERENCE TO RELATED APPLICATIONS

This application claims priority from Japanese Patent Application No. 2022-026136 filed on Feb. 22, 2022. The entire content of the priority application is incorporated herein by reference.

BACKGROUND ART

The present disclosures relate to a technique for managing a communication system.

Communication devices such as printers and scanners are typically configured to communicate with other communication devices via networks. For managing such a communication device, a server can be used. For example, there is known a conventional communication system having a PC (personal computer), an information management server and a printer. In such a communication system, the PC requests the information management server to issue a PIN code. Then, the information management server issues the PIN code, and transmits code display information for displaying the PIN code on a display to the PC. On a display of a printer connected to the PC, a code registration screen is displayed. The printer then transmits code information related to the PIN code filled out in an input field of the code registration screen as well as a model name and a serial number of the printer to the information management server. When receiving the code information, the serial number and the model name, the information management server extracts account data including the PIN code corresponding to the code information from a data storage area, and stores the extracted account data in association with the serial number and the model name as printer information in the data storage area.

DESCRIPTION

The communication devices may be used in various situations. For example, a user of a communication device could be an administrator thereof. In such a case, the management of the communication devices needs to be improved.

According to aspects of the present disclosures, there is provided a server of a communication system including an administrator's device, a terminal device, a communication device and a controller having hardware, the server being communicatable with each of the administrator's device, the terminal device and the communication device. The controller is configured to perform first obtaining a first request for information associated with an administrator of the communication device from the administrator's device, first transmitting management information associated with the administrator to the management device in response to the first request, second obtaining an information request for information to be used by the communication device from the communication device, second transmitting authentication information to use the communication device to the communication device, third obtaining the authentication information and the management information from the terminal device, the authentication information obtained from the terminal device being information transmitted by the terminal device based on the authentication information received by the communication device, the management information obtained from the terminal device being information to be transmitted by the terminal device based on the management information received by the management device, and first associating the management information obtained from the terminal device with identification information of the communication device.

According to aspects of the present disclosures, there is provided a non-transitory computer-readable recording medium for a server of a communication system including an administrator's device, a terminal device, a communication device and a controller having hardware, the server being communicatable with each of the administrator's device, the terminal device and the communication device. The recording medium contains computer-executable instructions which cause, when executed by the controller, the server to perform first obtaining a first request for information associated with an administrator of the communication device from the administrator's device, first transmitting management information associated with the administrator to the management device in response to the first request, second obtaining an information request for information to be used by the communication device from the communication device, second transmitting authentication information to use the communication device to the communication device, third obtaining the authentication information and the management information from the terminal device, the authentication information obtained from the terminal device being information transmitted by the terminal device based on the authentication information received by the communication device, the management information obtained from the terminal device being information to be transmitted by the terminal device based on the management information received by the management device, and first associating the management information obtained from the terminal device with identification information of the communication device.

FIG. 2A shows an example of a registration table.

FIG. 2B shows an example of a delivery table.

FIG. 2C shows an example of a device table.

FIG. 6A shows an example of a temporary device table.

FIG. 6B shows an example of an updated delivery table.

FIG. 6C shows an example of an updated device table.

FIG. 7A shows an example of the temporary device table.

FIG. 7B shows an example of the updated delivery table.

FIG. 7C shows an example of the updated device table.

A. EMBODIMENT

A1. System Configuration

Figure 1:
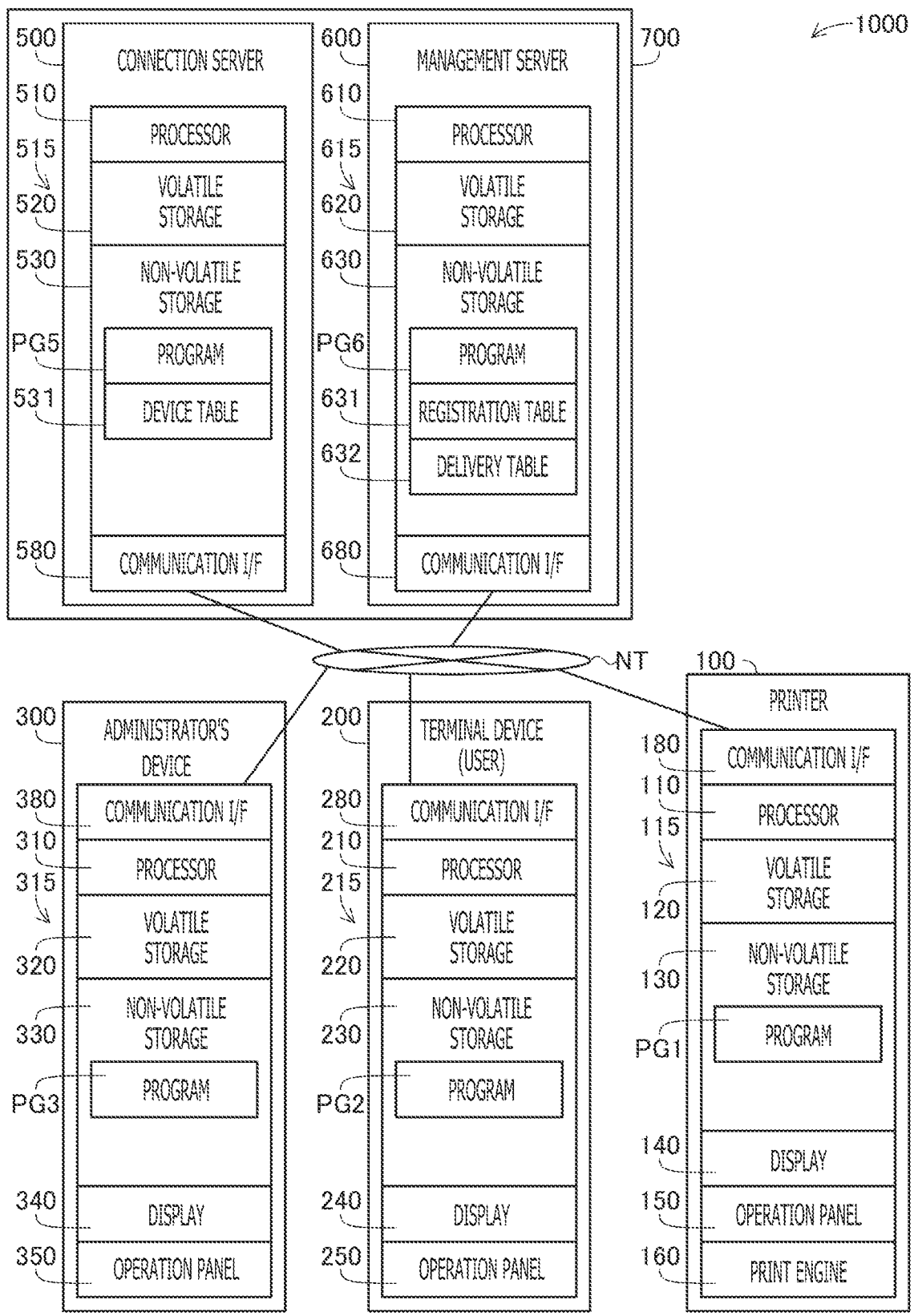
FIG. 1 is a block diagram of a communication system according to the present disclosures.

FIG. 1 is a block diagram showing a system configuration of a communication system 1000. The communication system 1000 includes a printer 100, a terminal device 200, an administrator's device 300, and a communication process server system 700. The communication process server system 700 includes a connection server 500 and a management server 600. In the following description, the communication process server system 700 may be simply referred to as a "processing server" 700. According to the present embodiment, the processing server 700 is provided by a printing service provider. The printing service provider provides the printers 100 to subscribers of the printing service.

The management server 600 manages services associated with the printer 100. According to the present embodiment, the management server 600 is configured to manage the delivery of consumables used by the printer 100. The printer 100 has a print engine 160. The print engine 160 is a printing device configured to print an image using a printing material (e.g., toner or ink) on a sheet (which is an example of a printing medium) using a particular printing method (e.g., a laser or inkjet printing method). In the present embodiment, it is assumed that the print engine 160 is a printing device employing the inkjet printing method using ink. The management server 600 performs a process of delivering refill ink to a delivery destination that is associated with the printer 100 in advance. For example, the management server 600 transmits, to a distributor server (not shown), instructions for shipping ink to the delivery destination. The distributor server will proceed with an ink shipment procedure according to the instructions. The management server 600 may perform the process for ink delivery in response to an order from a user of the printer 100. Alternatively, the management server 600 may obtain the remaining amount of ink from the printer 100 and perform the process for the ink delivery when the remaining amount is low.

The printing services that a subscriber can subscribe to may include a variety of services, such as a subscription service that allows the subscriber to print up to a designated number of copies each month. When a subscription service is subscribed, the management server 600 may assign a new number of printable sheets to the printer 100 each month. The printer 100 allows the user to print up to the above number of printable sheets.

The connection server 500 establishes a continuous connection with the printer 100. Any method of maintaining the continuous connection may be used. For example, the connection server 500 and the printer 100 establish a communication session for the continuous connection according to an XMPP (Extensible Messaging and Presence Protocol). The communication between the printer 100 and the management server 600 is performed via the connection server 500.

The administrator's device 300 is a terminal device of the administrator of the printer 100, and is, for example, a computer (e.g., a smartphone, a personal computer, or the like). The administrator of the printer 100 may be any of various types of people. When the printer 100 is used in a home, the administrator of the printer 100 could be a member of the family (e.g., a father, a mother or the like). When a company subscribes to the printing service, the administrator may be an employee.

The terminal device 200 is a terminal device of a user of the printer 100, and is, for example, a computer (e.g., a smartphone, a personal computer or the like). The user of the printer 100 may be any of various types of people. The user of the printer 100 may be different from the administrator of the printer 100. For example, when the printer is used in a home, the user may be a member (e.g., a child) different from the administrator. When a company subscribes to the printing service, the user may be an employee different from the administrator. When the user works from home, the printer 100 may be installed at the home of the user, not an office.

In the present embodiment, the user of the printer 100 registers the printer 100 in the management server 600 so as to be managed by the management server 600. The management server 600 accepts the registration of the printer 100 with the approval of the administrator. As will be described, the processing server 700 uses authentication information so that the printer 100 can be registered easily, even if the user is different from the administrator.

The devices 100, 200, 300, 500 and 600 are connected to a network NT. The network NT may include the so-called Internet. Further, the network NT may include a so-called a local area network.

The printer 100 has a processor 110, a storage 115, a display 140, an operation panel 150, a print engine 160 and a communication interface 180. These components are interconnected via a bus, as used in well-known devices. The storage 115 includes a volatile storage 120 and a non-volatile storage 130. The processor 110 is a device (e.g., a CPU) configured to perform data processing. The volatile storage 120 is, for example, a DRAM, and the non-volatile storage is, for example, a flash memory.

The display 140 is a device configured to display images, and is, for example, a liquid crystal display, an organic EL display, an LED display or the like. The operation panel 150 is configured to receive user operations and includes, for example, buttons, levers, and a touch panel overlaid on the display 140. The communication interface 180 is an interface configured to communicate with other devices. For example, the communication interface 180 may include at least one of a USB interface, a wired LAN interface, and a wireless interface compliant with IEEE 802.11 standards. According to the present embodiment, the communication interface 180 is connected to the network NT.

The non-volatile storage 130 contains a program PG1. The program PG1 has been stored in the non-volatile storage 130 in advance as firmware by a manufacturer of the printer 100. The processor 110 performs various processes by executing the program PG1.

The terminal devices 200 and 300 have processors 210 and 310, storages 215 and 315, displays 240 and 340, operation panels 250 and 350, and communication interfaces 280 and 380, respectively. In each of the terminal devices 200 and 300, respective components are interconnected via a conventionally-known bus. The storages 215 and 315 include volatile storages 220 and 320, and non-volatile storages 230 and 330, respectively. The processors 210 and 310 are devices configured to perform data processing, and are, for example, CPUs, respectively. The volatile storages 220 and 320 are, for example, DRAMs and the non-volatile storages 230 and 330 are, for example, flash memories.

The displays 240 and 340 are devices configured to display images and are, for example, liquid crystal displays, organic EL displays, LED displays or the like. The operation panels 250 and 350 are devices configured to receive user operations and are, for example, buttons, levers, and touch panels overlaid on the displays 240 and 340, respectively. The communication interfaces 280 and 380 are interfaces to communicate with other devices. For example, each of the communication interfaces 280 and 380 includes at least one of a USB interface, a wired LAN interface, and a wireless interface compliant with the IEEE 802.11 standard. According to the present embodiment, the communication interfaces 280 and 380 are connected to the network NT.

The non-volatile storages 230 and 330 contain programs PG2 and PG3 for the operations of the terminal devices 200 and 300, respectively. The processors 210 and 310 perform various processes (described later) in accordance with the programs PG2 and PG3, respectively.

The servers 500 and 600 have processors 510 and 610, storages 515 and 615, and communication interfaces 580 and 680, respectively. In the server 500, the processor 510, the storage 515, and the communication interface 580 are connected with each other via a bus, and in the server 600, the processor 610, the storage 615, and the communication interface 680 are connected with each other via a bus. The storages 515 and 615 include volatile storages 520 and 620, and non-volatile storages 530 and 630, respectively. Each of the processors 510 and 610 is a device configured to perform a data processing and is, for example, a CPU. Each of the volatile storages 520 and 620 is, for example, a DRAM. Each of the non-volatile storages 530 and 630 is, for example, a flash memory. Each of the communication interfaces 580 and 680 is an interface configured to communicate with another device. For example, each of the communication interfaces 580 and 680 includes at least one of a USB interface, a wired LAN interface, and a wireless interface compliant with the IEEE802.11 standard. According to the present embodiment, each of the communication interfaces and 580 and 680 is connected to the network NT.

The non-volatile storages 530 and 630 store, in advance, programs PG5 and PG6 for the operations of the servers 500 and 600, respectively. The processors 510 and 610 perform various processes in accordance with the programs PG5 and PG6, respectively.

The non-volatile storage 530 of the connection server 500 further includes data indicating a device table 531. The non-volatile storage 630 of the management server 600 is further configured to store data indicating a registration table 631, and a delivery table 632. The registration table 631 and the delivery table 632 will be described later.

A2. Configuration of Tables

FIG. 2A shows an example of the registration table 631. The registration table 631 indicates information related to subscriptions having been registered. In the present embodiment, the registration table 631 indicates a relationship among a subscriber identifier LID, password information PW, a registration identifier CID, a subscription identifier ZID, and a management identifier UID. The subscriber identifier LID is an identifier of the subscriber of the printing service. The password information PW is information to be used for a password authentication to sign in to a webpage for management (e.g., a hashed value of a password). The registration identifier CID is an identifier of subscription registration. As will be described later, the registration identifier CID is shared by the management server 600 and the connection server 500. The subscription identifier ZID is an identifier of a subscription to the registered printing service. The management identifier UID is information used to register the printer 100. The printing service provider registers information about the subscription in the registration table 631 in response to the subscriber's subscription to the printing service. In an example shown in FIG. 2A, the relationship among a first subscriber identifier LID1, first password information PW1, a first registration identifier CID1, a first subscription identifier ZID1, and a first management identifier UID1 has been registered. It is noted that the management identifier UID is issued by the management server 600 in response to a request by the administrator of the printer 100.

FIG. 2B shows an example of the delivery table 632. The delivery table 632 shows a relationship among the subscription identifier ZID, a plan PL, a device identifier DID, and a delivery destination ADR. The subscription identifier ZID is the same as the subscription identifier ZID in the registration table 631 (see FIG. 2A). The plan PL is an identifier of a content of the subscription (e.g., a fixed price service). The device identifier DID is an identifier of a printer (e.g., the printer 100). The delivery destination ADR indicates a delivery destination, which is typically an address where the printer 100 is placed) of consumables. The management server 500 registers information related to a newly registered printer in the delivery table 632 in the registration process. The subscription identifier ZID and the plan PL are determined by the printing service provider in response to the subscription of the printing service by the subscriber. The device identifier DID is determined in advance for each printer. The delivery destination ADR is determined by the user of the printer. The delivery destination ADR is an example of device information to be associated with the printer 100.

In the example shown in FIG. 2B, the information ZID1, PL1, DID1, and ADR1 related to the first device identifier DID1 and the information ZID1, PL1, DID2, and ADR2 related to the second device identifier DID2 have been registered. The first subscription identifier ZID1 and the first plan PL1 are common to the two device identifiers DID1 and DID2. By the registration table 631 (see FIG. 2A), the first subscription identifier ZID1 is associated with the first subscriber identifier LID1. In the example shown in FIGS. 2A and 2B, two printers respectively corresponding to the two device identifiers DID1 and DID2 are associated with the single first subscriber identifier LID1.

FIG. 2C shows an example of the device table 531. The device table 531 shows a relationship between the registration identifier CID and the device identifier DID. The information in the device table 531 is registered in the registration process described later. In the example shown in FIG. 2C, a relationship between a first registration identifier CID1 and a first device identifier DID1 and a relationship between the first registration identifier CID1 and a second device identifier DID2 have been registered.

A3. Issuance Process of Management Identifier

Figure 3:
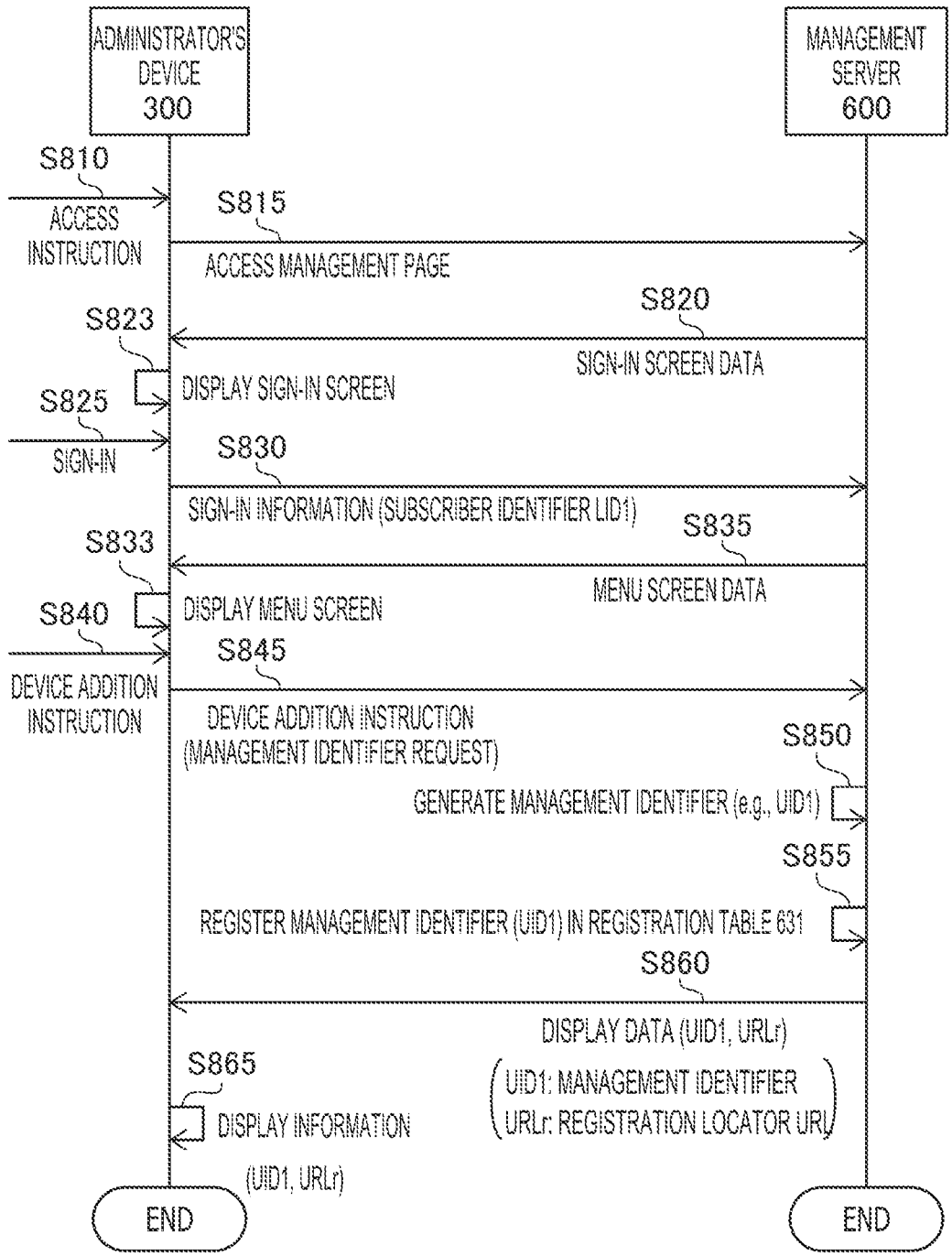
FIG. 3 is a sequence diagram showing an example of an issuance process of a management identifier.

FIG. 3 is a sequence diagram showing an example of an issuance process for the management identifier UID (FIG. 2A). In FIG. 3, the issuance processes of the administrator's device 300 and the management server 600 are shown. The processors 310 and 610 of the devices 300 and 600 execute the issuance processes therefor, by executing the programs PG3 and PG6, respectively.

In S810, the administrator inputs an access instruction to a management page by operating the operation panel 350 of the administrator's device 300. As an input method to input the access instruction, any method can be used. For example, the administrator may input an URL of the management page via the browser running on the administrator's device 300. The URL of the management page is determined in advance. In S815, the processor 310 of the administrator's device 300 transmits a request for the management page to the management server 600 by accessing the URL of the management page. In the present embodiment, the management page is a webpage. Further, the program PG3 of the administrator's device 300 is a program of the web browser.

In S820, the processor 610 of the management server 600 transmits data indicating the webpage corresponding to the request from the administrator's device 300. According to the present embodiment, the webpage is a sign-in screen for the management. In S823, the processor 310 of the administrator's device 300 displays the sign-in screen on the display 340 (not shown) using the received data. In the present embodiment, the sign-in screen is configured such that the user input the subscriber identifier and the password for the password authentication. It is noted that a method of sign-in is not necessarily limited to the password authentication but any other authentication method may be employed.

In S825, the administrator inputs the subscriber identifier (in this case, a first subscriber identifier LID1) by operating the operation panel of the administrator's device 300. The administrator is notified, in advance, by the subscriber of the first subscriber identifier LID1 and the password to manage the printer. In S830, the processor 310 of the administrator's device 300 transmits the data indicating the input information to the management server 600. In the following description, it is assumed that the password authentication is successful.

In S835, the processor 610 of the management server 600 transmits the data representing the webpage of the menu screen to the administrator's device 300. In S833, the processor 310 of the administrator's device 300 displays the menu screen on the display 340 using the received data.

In S840, the administrator inputs an addition instruction to add a device by operating the operation panel 350 of the administrator's device. In S845, the processor 310 of the administrator's device 300 transmits the addition instruction to the management server 600. This instruction indicates an issuance request for the management identifier.

In S850, the processor 610 of the management server 600 generates a management identifier UID. In the present embodiment, the management identifier UID is a combination of multiple characters including numerals and alphabets. The processor 610 randomly generates the combination of multiple characters (i.e., the management identifier UID) using a random number. In the following description, it is assumed that the generated management identifier UID is a first management identifier UID1.

In S855, the processor 610 registers the generated first management identifier UID in the registration table 631 (FIG. 2A). The processor 610 sets the management identifier UID associated with the subscriber identifier LID1 obtained in S830 to the first management identifier UID1.

In S860, the processor 610 transmits display data used to display the generated first management identifier UID1, a registration locator URLr which is the URL of the registration form on the administrator's device 300 to the administrator's device. In the present embodiment, the display data is data of a webpage which displays the information UID1 and URLr. The registration locator URLr has been determined in advance. The registration locator URLr may be a URL which has been associated, in advance, with the subscriber identifier LID or the administrator identifier UID. Alternatively, the processor 610 may determine a different URL as the registration locater URLr at every execution of the registration process. For example, the processor 610 uses a random number to generate a combination of multiple numerals, and employs a URL including the thus generated combination of multiple numbers as the registration locator URLr.

In S865, the processor 310 of the administrator's device 300 displays the first management identifier UID and the registration locator URLr on the display 340 using the display data received in S860. The administrator can recognize the first management identifier UID1 and the registration locator URLr by observing the display 340. Then, the process shown in FIG. 3 is terminated.

The administrator informs the user who should be allowed to register the printer with the information UID and URLr. In the present embodiment, the fact that the administrator notifies the user of the first management identifier UID means the administrator authorizes the user to register the printer. A method of notifying the user of the first management identifier UID1 may be any method. For example, an electronic notification method such as an email and/or posting on an electronic bulletin board that can be browsed by only by persons involved may be employed. Alternatively or optionally, physical methods of communication, such as mailing paper documents, may be employed. In either case, it is preferred that the communication method be configured in such a way that it is difficult for a third party to obtain the first management identifier UID1.

A4. Registration Process

Figure 4:
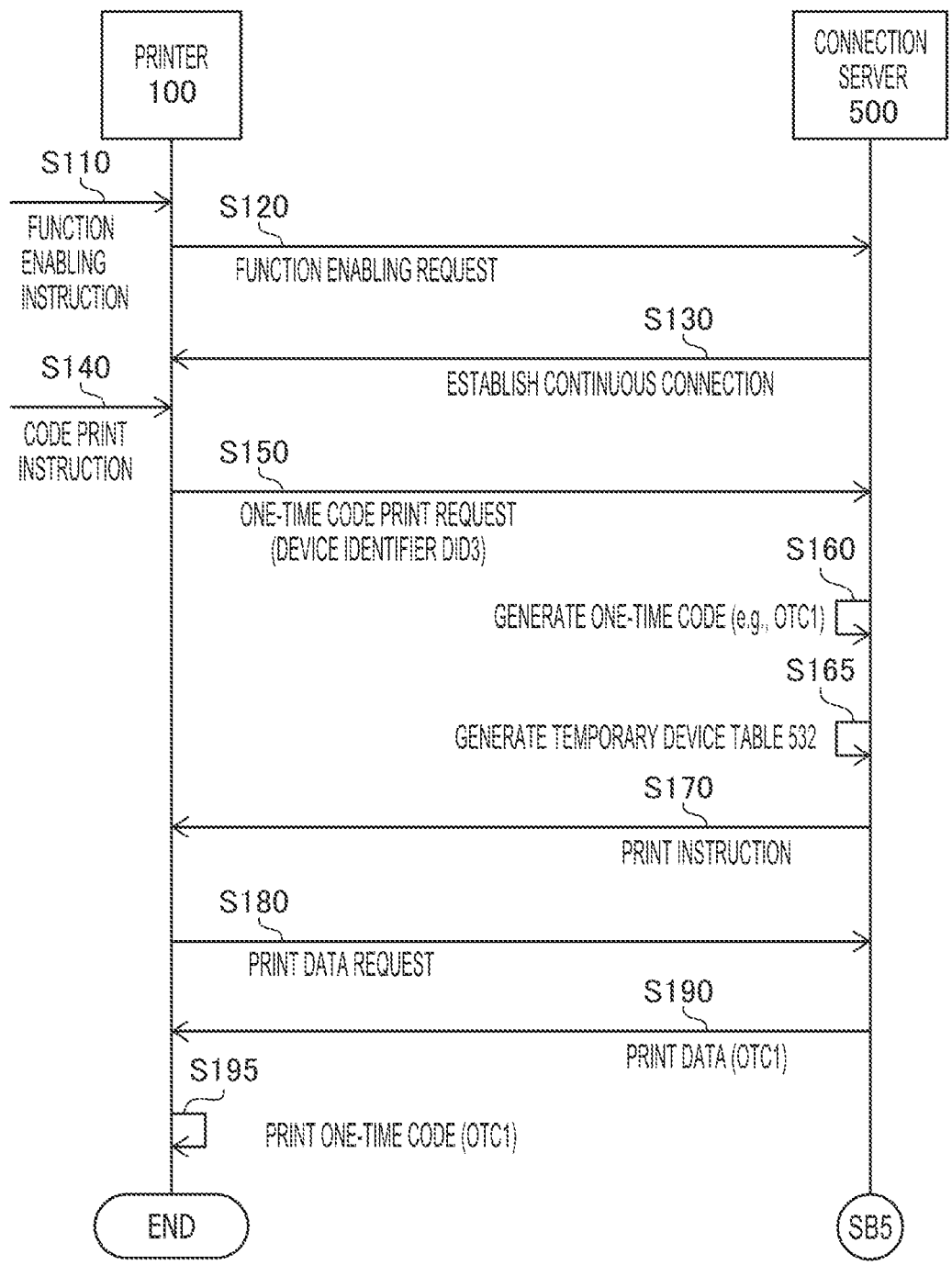
FIG. 4 is a sequence diagram showing an example of a registration process.
Figure 5:
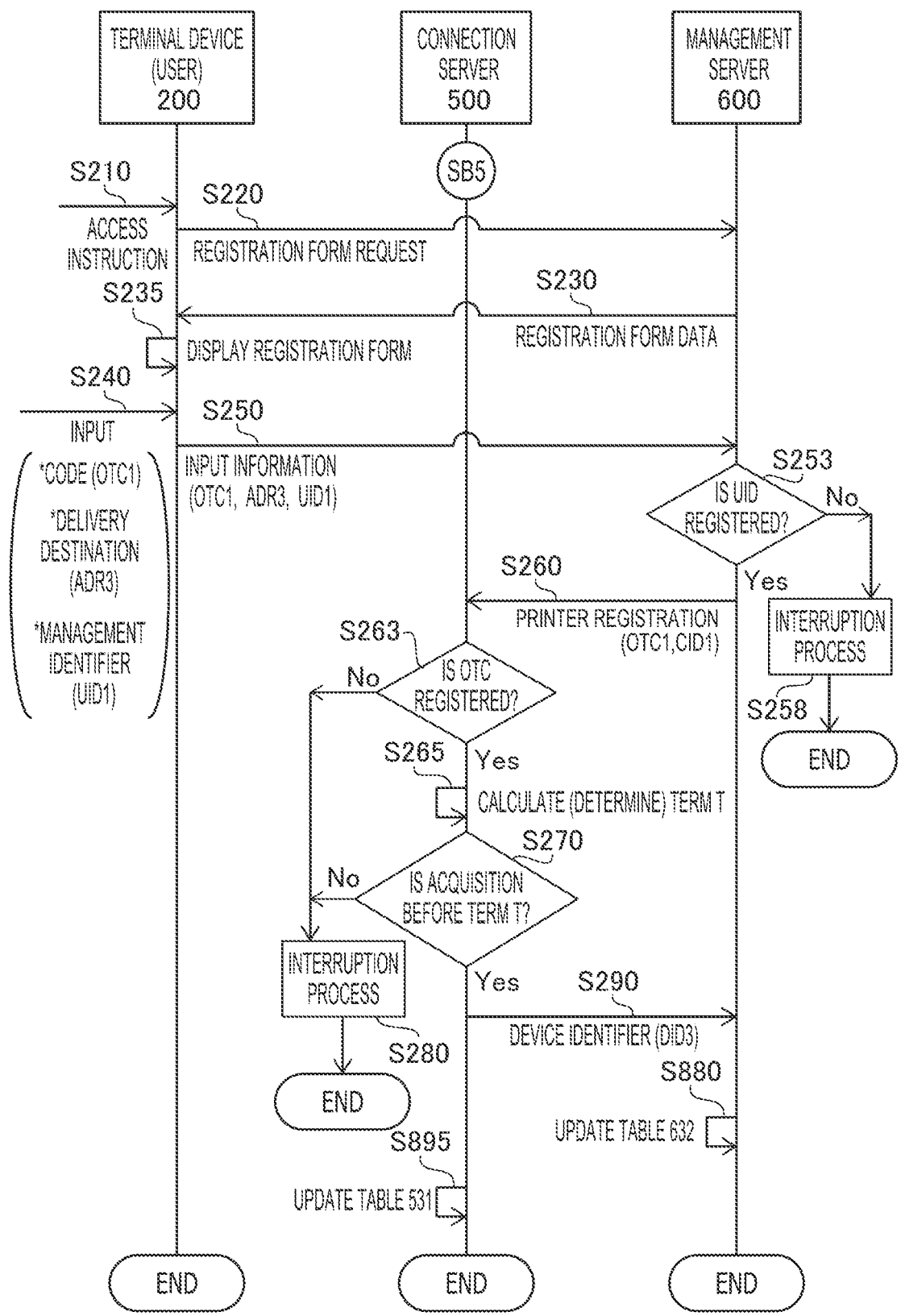
FIG. 5 is a sequence diagram showing an example of the registration process.

FIGS. 4-5 are sequence diagrams illustrating the registration process. The registration process proceeds in the order of FIGS. 4 and 5. The registration process is a process of registering information related to the printer 100 with the processing server 700. It is noted that, in FIGS. 4-5, processes of respective devices 100, 200, 500 and 600 are indicated. The processors 110, 210, 510 and 610 of the devices 100, 200, 500 and 600 execute programs PG1, PG2, PG5 and PG6 to perform the processes, respectively.

In S110 (FIG. 4), the user inputs an instruction to enable the printing function by operating the operation panel 150 of the printer 100. In the present embodiment, the enablement of the printing function includes an establishment of a continuous connection between the printer 100 and the connection server 500, and a registration of information related to the printer 100 with the processing server 700. In S120, the processor 110 of the printer 100 transmits a request for function enablement to the connection server 500, according to the instruction. In S130, the processor 510 of the connection server 500 executes a process of establishing the continuous connection. In this way, the continuous connection between the connection server 500 and the printer 100 is established.

In S140, the user inputs an instruction to print a one-time code by operating the operation panel 150 of the printer 100. In S150, the processor 110 of the printer 100 transmits a request for printing the one-time code to the connection server 500. This request includes data indicating the device identifier that is the identifier of the printer 100. Hereinafter, it is assumed that the device identifier of the printer 100 is a third device identifier DID3. It is noted that, according to the present embodiment, the data indicating the third device identifier DID3 has been stored in the non-volatile storage 130 of the printer 100 in advance.

In S160, the processor 510 of the connection server 500 generates the one-time code in response to the request. The one-time code is an example of the authentication information that is used in the authentication. In the present embodiment, the one-time code is a combination of multiple characters such as numerals and/or alphabets. According to the present embodiment, the processor 510 uses random numbers to randomly generate a combination of multiple characters (i.e., the one-time code). In the following description, it is assumed that the one-time code as generated is a first one-time code OTC1.

In S165, the processor 150 generates a temporary device table 532. FIG. 6A schematically shows an example of the temporary device table 532. In the present embodiment, the temporary device table 532 shows the relationship between the one-time code OTC, the device identifier DID, and the registration date and time RT. The one-time code OTC is the one-time code generated in S160. The device identifier DID is the device identifier obtained in S150. The processor 510 registers a combination of the information DID3 and OTC1 obtained in S150 and S160 in the temporary device table 532. The registration date and time RT is the date and time when the information DID and OTC are registered. The processor 510 obtains the current date and time by referring to a timer provided in the connection server 500 (not shown), and registers the obtained current date and time as the registration date and time RT in the temporary device table 532. In the present embodiment, the registration date and time RT is represented by year, month, hour, and minute. As described below, the registration date and time RT are used to calculate the expiration date T of the one-time code OTC. The processor 510 stores data indicating the temporary device table 532 in the storage 515 (e.g., non-volatile storage device 530).

In S170 (FIG. 4), the processor 510 of the connection server 500 transmits a print instruction to the printer 100. In S180, the processor 110 of the printer 100 transmits a request for the print data to the connection server 500 in response to the print instruction. In S190, the processor 510 of the connection server 500 generates the print data for printing the one-time code (in this case, the first one-time code OTC1). The data format of the print data may be any data format suitable for the printer 100. The processor 510 transmits the generated print data to the printer 100. In S195, the processor 110 of the printer 100 controls the print engine 160 according to the received print data. The print engine 160 prints the first one-time code OTC1.

In S210 (FIG. 5), the user enters an access instruction to the registration form by operating the operation panel 250 of the terminal device 200. The method of inputting the access instructions may be any method. For example, the user may enter the URL (Uniform Resource Locator) of the registration form to a browser running on the terminal device 200. As described with reference to FIG. 3, the URL of the registration form (in this case, a registration locator URLr) has been notified from the administrator to the user in advance. In S220, the processor 210 of the terminal device 200 transmits the request for the registration form to the management server 600 by accessing the URL of the registration form. In the present embodiment, the registration form is a web form for entering information. Furthermore, the program PG2 of the terminal device 200 is a web browser program.

In S230, the processor 610 of the management server 600 transmits the data of the registration form to the terminal device 200. In S235, the processor 210 of the terminal device 200 displays the registration form on the display 240 according to the data received.

The registration form displayed on the display 240 is an example of an input screen for inputting information. In S240, the user inputs information for registration by operating the operation panel 250 of the terminal device 200. In the present embodiment, the information input includes the one-time code, a delivery destination of consumables, and the management identifier. The user inputs the one-time code (i.e., the first one-time code OTC1) printed in S195 (FIG. 4) and the management identifier notified by the administrator (in this case, the first management identifier UID1). Further, it is assumed that the third delivery destination ADR3 is input as the delivery destination. In S250, the processor 210 of the terminal device 200 transmits data indicating the input information OTC1, ADR3, and UID1 to the management server 600.

In S253, the processor 610 of the management server 600 determines whether the management identifier UID obtained in S250 is an appropriate management identifier UID. In the present embodiment, the processor 610 determines that the management identifier UID is appropriate when the management identifier UID has been registered in the registration table 631 (FIG. 2A). A third party who has not been authorized to register a printer is not notified of the appropriate management identifier UID by the administrator. Therefore, the third party cannot input the registered management identifier UID in S240 (FIG. 5). In this way, when an unregistered management identifier UID is input (S253: NO), the processor 610 executes the interruption process for registration of the printer 100. Then, the processor 610 terminates the registration process. It is noted that the interruption process may be any of various processes.

When the management identifier UID has been registered (S253: YES), the processor 610 obtains, with reference to the registration table 631 (FIG. 2A), a registration identifier CID1 that is associated with the first management identifier UID obtained in S250. Then, the processor 610 transmits a registration instruction for the printer to the connection server 500. This instruction contains data indicating the one-time code OTC1 and the first registration identifier CID1.

In S263, the processor 510 of the connection server 500 determines whether the received one-time code has been registered in the temporary device table 532 (FIG. 6A). When the one-time code has not been registered in the temporary device table 532 (S263: NO), the processor 510 determines that the authentication is failed, and executes an interrupting process of registering the printer 100 (S280). Then, the processor 510 terminates the registration process. The interrupting process could be any of various processes. For example, the interrupting process may include a process of notifying an interruption to the management server 600.

When the one-time code has been registered in the temporary device table 532 (S263: YES), the processor 510 of the connection server 500 determines an effective date of the one-time code OTC1 included in the received registration instruction in S265. In the present embodiment, the processor 510 calculates an effective term T by adding a particular effective time dT (e.g., 24 hours) to the registration data and time RT (see FIG. 6A).

In S270, the processor 510 determines whether the date and time of acquisition of the one-time code OTC1 from the terminal device 200 is before the effective term T. In the present embodiment, the process of S260-S265 is finished within a relatively short period of time. Therefore, the processor 510 uses the current date and time obtained by referring to a timer (e.g., a built-in timer) as the date of time of acquisition of the one-time code OTC1.

When the acquisition date and time of the one-time code OTC1 is equal to or after the effective term T (S270: NO), the processor 510 determines that the authentication is failed, and executes the interruption process of the registration of the printer 100 (S280). Then, the processor 510 terminates the registration process.

When the date and time of the acquisition of the one-time code OTC1 is before the effective date (S270: YES), the processor 510 determines that the authentication is successful, and data indicating the device identifier DID3 to the management server 600.

In S880, the management server 600 updates the delivery table 632. FIG. 6B illustrates an example of the updated delivery table 632. This delivery table 632 shows the table updated from the delivery table 632 shown in FIG. 2B. As shown in FIG. 6B, the first relationship R1 has been added. The processor 610 determines the information ZID, PL, DID, and ADR of the first relationship R1 as follows.

The subscription identifier ZID and the plan PL are determined to be those (here, the first subscription identifier ZID1 and the first plan PL1) which have already been associated with the subscriber identifier LID (here, the first subscriber identifier LID1) that is obtained in S250 (FIG. 5). The relationship among the management identifier UID, the subscription identifier ZID and the plan PL is indicated by the registration table 631 (FIG. 2A) and the delivery table 632 (FIG. 2B). The device identifier DID is determined to be the device identifier obtained in S290 (FIG. 5) (in this case, a third device identifier D3). The deliver destination ADR is determined to be the delivery destination obtained in S290 (FIG. 5) (in this case, a third delivery destination ARD3). It is noted that the registration table 631 may further indicate the plan PL. In such a case, the plan PL in the registration table 631 may have been registered in the registration table 631 in response to the subscriber subscribing to the printing service. Further, in S880, the processor 610 may refer to the plan PL in the registration table 631.

The updated delivery table 632 (FIG. 6B) and the registration table 631 (FIG. 2A) associate the subscriber identifier LID with the device identifier DID via the subscription identifier ZID. The processor 610 associates the subscriber identifier LID with the device identifier DID by updating the delivery table 632.

In S895, the processor 510 of the connection server 500 updates the device table 531. FIG. 6C schematically shows an example of the updated device table 531. This device table 531 shows a table updated from the device table 531 shown in FIG. 2C. As shown in FIG. 6C, in the updated device table 531, the second relationship R2 has been added. The processor 510 determines the registration identifier CID of the second correspondence R2 is to be the registration identifier CID1 obtained in S260. The processor 510 determines the device identifier DID in the second relationship R2 to be the device identifier DID3, which is associated with the one-time code OTC1 obtained in S260 through the temporary device table 532 (FIG. 6A). Then, the registration process is terminated.

As described above, according to the present embodiment, the printer 100 (FIG. 1) is configured to communicate with other devices (e.g., the processing server 700) via the network NT. Such a printer 100 is an example of a communication device (hereinafter, the printer 100 may also be referred to as a communication device 100). The processing server 700 is configured to communicate with the administrator's device 300, the terminal device 200, and the communication device 100. In the present embodiment, the processing server 700 has the communication server 500 and the management server 600. The connection server 500 and the management server 600 share some of the functions performed by the communication process server system 700.

The connection server 500 and the management server 600 perform the following processes.

In S845 (FIG. 3), the management server 600 obtains a request for the management identifier UID from the administrator's device 300. The management identifier UID is an example of management information associated with the administrator of the communication device 100. In the following description, such a request for the management information (in this case, the management identifier UID) will also be referred to as a first request. In S860, the management server 600 transmits the management identifier UID to the administrator's device 300 in response to the first request.

In S150 (FIG. 4), the connection server 500 obtains a request for a one-time code from the communication device 100. The one-time code is an example of authentication information, which is information for using the communication device 100. Hereafter, this request for authentication information (in the present embodiment, the one-time code) is also referred to as an information request. In S190, the connection server 500 transmits the one-time code OTC1 to the communication device 100.

In S250 (FIG. 5), the management server 600 obtains the one-time code OTC1 and the management identifier UID from the terminal device 200.

The one-time code OTC1 obtained from the terminal device 200 is information the terminal device 200 transmits based on the one-time code OTC1 received by the communication device 100. In the present embodiment, in S195 (FIG. 4), the communication device 100 prints out the received one-time code OTC1. In S240 (FIG. 5), the user observes the one-time code OTC1 printed by the communication device 100, and inputs the one-time code into the terminal device 200. In this way, the one-time code OTC1 is delivered by the user from the communication device 100 to the terminal device 200. The terminal device 200 is configured to receive the one-time code OTC1 that is received by the communication device 100. Concretely, the terminal device 200 is configured to receive the one-time code OTC1 in accordance with an instruction by the user (e.g., the user operation of the operation panel 250).

The management identifier UID obtained from the terminal device 200 is information which the terminal device 200 transmits based on the management identifier UID received by the administrator's device 300. In the present embodiment, the administrator's device 300 displays the received management identifier UID1 in S865 (FIG. 3). The administrator informs the user of the management identifier UID1. In S240 (FIG. 5), the user input the management identifier UID into the terminal device 200. As above, the management identifier UID1 is transmitted from the administrator's device 300 to the terminal device 200 by the administrator and the user. The terminal device 200 is configured to receive the management identifier UID1 received by the administrator's device 300. Concretely, the terminal device 200 is configured to receive the management identifier UID in accordance with a user instruction (in this case, an operation of the operation panel 250).

In S880 (FIG. 5), the management server 600 associates the management identifier UID1, which is obtained from the terminal device 200, with the device identifier DID3 of the communication device 100 by updating the delivery table 632 (FIG. 6B). In the present embodiment, the management identifier UID1 and the device identifier DID3 are associated by the registration table 631 (FIG. 2A) and the updated delivery table 632 (FIG. 6B).

As above, when the user of the communication device 100 is different from the administrator of the communication device 100, the processing server 700 can appropriately associate the management information (in this case, the management identifier UID1) with the device identifier DID3 of the communication device 100.

In S250 (FIG. 5), the management server 600 obtains the delivery destination ADR3 from the terminal device 200. The delivery destination ADR3 is an example of device information that should be associated with the communication device 100. In S880 (FIG. 5), the management server 600 associates the device identifier DID3 of the communication device 100 with the delivery destination ADR3 by updating the delivery table 632 (FIG. 6C). In this way, the processing server 700 can appropriately associate the management information with the identification information and the device information of the communication device.

The device information which is to be associated with the communication device contains the delivery destination ADR of a consumable (in this case, the ink) used by the communication device 100. Thus, the processing server 700 can appropriately associate the management information with the identification information of the communication device.

As shown in FIG. 1, the communication device 100 includes the print engine 160. In S190 (FIG. 4), the connection server 500 transmits data that causes the print engine 160 to print the one-time code, which is an example of authentication information, to the communication device 100. The one-time code obtained from the terminal device 200 in S250 (FIG. 5) indicates the one-time code that is input to the terminal device 200 in S240. In this way, by having the printing engine 160 of the communication device 100 print the authentication information, and by obtaining the authentication information input to the terminal device 200, the processing server 700 can appropriately associate the management information with the identification information of the communication device.

In S265 (FIG. 5), the connection server 500 determines the term T for obtaining the one-time code OTC1 from the terminal device 200 (S250). When the one-time code OTC1 is obtained after the term T (S270: NO), the connection server 500 terminates the registration process without executing the process of S290 (i.e., the transmission of the device identifier DID3). In this case, the management server 600 does not execute the process of S880 (i.e., updating of the delivery table 632). In this way, the processing server 700 prohibits the association of the management information (in this case, the management identifier UID1) obtained from the terminal device 200 with the device identifier DID3 of the communication device (S880).

When the one-time code OTC1 is obtained before the term T (S270: YES), the connection server 500 performs the process of S290. Then, the management server 600 executes the process of S880. That is, the processing server 700 allows the association of the management identifier UID obtained from the terminal device 200 with the device identifier DID3 of the communication device 100 (S880).

When the time between the generation of authentication information (in this case, the one-time code OTC1) (FIG. 3: S160) and the acquisition of authentication information (FIG. 5: S250) is long, the authentication information may have been improperly acquired. For example, a third party may improperly obtain a printed copy of the one-time code OTC1 and proceed with S240 and S250 in FIG. 4. In the present embodiment, the processing server 700 can suppress a possibility of inappropriate association of the management information with other information due to inappropriate acquisition of the authentication information. For example, the possibility of an inappropriate combination of administrator information and the device identifier DID3 can be reduced.

B. MODIFIED EMBODIMENT

The registration process shown in FIGS. 4-5 is a process of registering one communication device 100. The processing server 700 is configured to parallelly perform multiple registration processes for multiple communication devices, respectively. FIGS. 7A-7C show an example of tables 532, 632 and 531 when two registration processes for two communication devices are performed in parallel. In the following description, it is assumed that a first user operates a first terminal device and first communication device to perform the registration process for the first communication device, and a second user operates a second terminal device and second communication device to perform the registration process for the second communication device. As will be described later, the processing server 700 uses different one-time codes for respective communication devices. In this way, the processing server 700 can perform the registration processes for the first and second communication devices in parallel. It is noted that the management identifier UID and the registration locator URLr described above with reference to FIG. 3 are commonly used for the multiple registration processes. Further, the registration process for one communication device is the same as the process shown in FIGS. 4-5.

In the registration process for the first communication device, the processing server 700 performs a first process including the multiple processes indicated below.

First Process

In S150 (FIG. 4), the connection server 500 obtains first information request indicating a request for a one-time code from the first communication device.

In S190 (FIG. 4), the connection server 500 transmits the one-time code to the first communication device. In the following description, the one-time code transmitted to the first communication device will be referred to as a first one-time code OTCa.

In S250 (FIG. 5), the management server 600 obtains the first one-time code OTCa and the management identifier UID from the first terminal device. It is noted that the first one-time code OCTa obtained from the first terminal device is information transmitted by the first terminal device based on the first one-time code received by the first communication device. The management identifier UID obtained from the first terminal device is information transmitted by the first terminal device based on the management identifier UID1 received by the administrator's device 300.

In S880 (FIG. 5), the management server 600 associates the management identifier UID obtained from the first terminal device with the first device identifier DIDa of the first communication device by updating the delivery table 632 (FIG. 7B).

The temporary device table 532 shown in FIG. 7A is a table generated in S165 (FIG. 3). The relationship including the first one-time code OTCa indicates information of the first communication device. The effective term Ta is calculated by adding the effective time dT to the registration date and time RTa.

The delivery table 632 shown in FIG. 7B indicates an updated table that is updated in S880 (FIG. 5). The first relationship R1a indicates information on the first communication device. By the delivery table 632 and the registration table 631 (FIG. 2A), the management identifier UID and the first device identifier DIDa of the first communication device are associated. The delivery destination ADR is set to a first delivery destination ADRa.

The device table 531 shown in FIG. 7C is a table updated in S895 (FIG. 5). The first relationship R1a indicates information on the first communication device.

The registration process for the second communication device is the same as that for the first communication device except that a one-time code OTCb, a device identifier DIDb and a delivery destination ADRb for the second communication device are different from the one-time code OCTa, the device identifier DIDa and the delivery destination ADRa for the first communication device, respectively. In the registration process for the second communication device, the processing server 700 performs a second process including the multiple processes indicated below.

Second Process

In S150 (FIG. 4), the connection server 500 obtains second information request indicating a request for a one-time code from the second communication device.

In S190 (FIG. 4), the connection server 500 transmits the one-time code to the second communication device. In the following description, the one-time code transmitted to the second communication device will be referred to as a second one-time code OTCb.

In S250 (FIG. 5), the management server 600 obtains the second one-time code OTCb and the management identifier UID from the second terminal device. It is noted that the second one-time code OCTb obtained from the second terminal device is information transmitted by the second terminal device based on the second one-time code received by the second communication device. The management identifier UID obtained from the second terminal device is information transmitted by the second terminal device based on the management identifier UID1 received by the administrator's device 300.

In S880 (FIG. 5), the management server 600 associates the management identifier UID obtained from the second terminal device with the second device identifier DIDb of the second communication device by updating the delivery table 632 (FIG. 7B).

The relationship including the second one-time code OTCb in the temporary device table 532 shown in FIG. 7A indicates information of the second communication device. The effective term Tb is calculated by adding the effective time dT to the registration date and time RTb. In S160 (FIG. 4), the processor 510 of the connection server 600 randomly generates the one-time code. Therefore, the second one-time code OTCb for the second communication device is different from the first one-time code OTCa for the first communication device.

The second relationship R1*b* of the delivery table 632 shown in FIG. 7B indicates information on the second communication device. By the delivery table 632 and the registration table 631 (FIG. 2A), the management identifier UID and the second device identifier DIDb of the second communication device are associated. The delivery destination ADR is set to a second delivery destination ADRb. The second delivery destination ADRb could be different from the first delivery destination ADRa.

The second relationship R2*b* in the device table 531 of FIG. 7C indicates information on the second communication device.

As described above, the processing server 700 can appropriately register the relationship between the management identifier UID1 and the first device indemnifier DIDa of the first communication device, and the relationship between the management identifier UID and the second device identifier DIDb of the second communication device. When three or more registration processes for three or more communication devices proceed in parallel, the processing server 700 can still properly register the information for each communication device. In the present embodiment, the processing server 700 uses a different one-time code for each communication device. This allows the processing server 700 to properly proceed with multiple registration processes in parallel.

The method of proceeding with multiple registration processes in parallel may be various other methods instead of using a one-time code that differs for each communication device. For example, the processing server 700 may use device identifiers to proceed with multiple registration processes in parallel. Concretely, in S240 (FIG. 5), the user further inputs the device identifier of the communication device. The management server 600 further obtains the device identifier in S250, and further transmits the device identifier to the connection server 500 in S260. Each process in S263-S895 is performed using the information to be associated with the device identifier.

C. FURTHER MODIFICATIONS

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

(1) The delivery destination ADR (FIG. 2B, FIG. 6B) is not necessarily limited to the delivery destination of the ink, but can be the delivery destination of any consumable used by the communication device (e.g., the printer 100), such as printing sheets, toner, photosensitive drum, and the like. For example, the device information may contain information on a payment method of a fee for printing services. It is noted that the device information may be omitted from the information that is registered in association with the device identifier DID.

(2) The authentication information may be any information instead of the one-time code and the PIN. For example, the authentication information may be an image such as a geometric pattern or a photograph. In either case, instead of newly generating the authentication information (FIG. 4: S160), the processing server 700 may select the authentication information to be used from among multiple pieces of authentication information determined in advance. As above, the processing server 700 may be configured to determine the authentication information to be used based on any of various processes such as a generating process, a selection process and the like. Alternatively, the authentication information may be information determined in advance. In such a case, the processing server 700 may be configured such that, when the registration process of one communication device is being performed, the registration processes for other communication devices are prohibited.

(3) The management information associated with the administrator may be any other information instead of the management identifier UID. For example, the management information may be an image such as a geometric pattern or a photograph. In either case, instead of newly generating the management information (FIG. 3: S850), the processing server 700 may select the management information to be used from among a plurality of pieces of management information that has been determined in advance. As above, the processing server 700 may be configured to determine the management information to be used based on any of various processes such as a generating process, a selection process and the like. Alternatively, the management information may be information determined in advance.

(4) The method of transmitting the management information from the management device 300 to the terminal device 200 may be an arbitrary method. For example, the management device 300 may be configured to display an image indicating the management information (e.g., a barcode or a QR code (registered trademark of DENSO WAVE)), and the terminal device 200 may obtain the management information by reading the displayed image with a digital camera. Alternatively, the management device 300 may transmit data representing the management information via a network. In either case, the terminal device 200 may be configured to obtain the management information in response to an operation by the user.

(5) The method of transmitting the authentication information (e.g., the one-time code) from the communication device 100 to the terminal device 200 may be an arbitrary method. For example, the communication device 100 may be configured to display an image indicating the authentication information (e.g., a barcode or a QR code), and the terminal device 200 may obtain the authentication information by reading the displayed image with a digital camera. Alternatively, the communication device 100 may transmit data representing the authentication information via a network. In either case, the terminal device 200 may be configured to obtain the authentication information in response to an operation by the user.

(6) In the embodiment shown in FIG. 5, the term T (FIG. 5: S265, S270, FIG. 6A) for obtaining the authentication information is the date and time after the elapse of the effective time dT from the registration date and time RT of the authentication information. In this configuration, the effective time dT may be variable. For example, the processor 510 of the connection server 500 may vary the effective time dT depending on a type of the printer. Further, the determination of the term T (S265) may be performed at any time between the generation of the authentication information by the processing server 700 (FIG. 4: S160) and the determination of the term T (S270). The connection server 500 may be configured to determine the term T instead of the connection server 500. In the embodiment shown in FIG. 5, the processes related to the term T (i.e., S265 and S270) may be omitted.

(7) The process of registering the information related to the communication device in the processing server 700 may be any of other processes instead of the processes described with reference to the above-described embodiment, modified embodiment and modifications. For example, establishment of the continuous connections between the processing server 7000 and the communication device 100 may be omitted.

The processing server 700 may be configured to perform processes indicated below.

A process of obtaining a first request indicating a request for information that is associated with the administrator of the communication device 100 from the management device 300 (e.g., FIG. 3; S845).

A process of transmitting the management information associated with the administrator to the management device 300 in response to the first request (e.g., S680).

A process of obtaining an information request which requests for information to use the communication device 100 from the communication device 100 (e.g., FIG. 4: S150).

A process of transmitting the authentication information that is information to use the communication device 100 (e.g., S190).

A process of obtaining, from the terminal device 200, the authentication information and the management information (e.g., FIG. 5: S250). It is noted that the authentication information obtained from the terminal device 200 is information transmitted by the terminal device 200 based on the authentication information received by the communication device 100. The management information obtained from the terminal device 200 is the information transmitted by the terminal device based on the management information received by the administrator's device 300.

A process of associating the management information obtained from the terminal device 200 with the identification information of the communication device 100 (e.g., FIG. 5: S880).

Any of the above processes may include a plurality of processes. The process of S250 in FIG. 5 includes the process of obtaining the device information (e.g., the delivery destination) and the process of obtaining the management information. As such, a single process may include multiple processes. Further, one or more of the above processes may be omitted from the processes performed by the processing server 700. For example, the communication device, the terminal device or the administrator's device may perform one or more of the above processes. The processing server 700 may be configured to further perform various processes in addition to the above processes.

(8) The communication device may be a variety of devices configured to perform particular functions in place of the printer 100. For example, the communication device may be a scanner configured to optically read an object. In any case, it is preferable that the processing server 700 associates the management information with the identification information of the communication device. Such an association can be used in various services. For example, the service provider may provide a cloud storage facility to subscribers for storing image data generated by scanners. The processing server (processing server) 700 may allow scanners having identification information that is associated with the management information to use the cloud storage.

(9) A single server device may provide all the functions of the processing server 700. In such a case, a single server device may perform both the functions of the connection server 500 and the management server 600. It is noted that, in such a case, the communication process between the connection server 500 and the management server 600 is omitted. The tables 631, 632, and 531 (FIGS. 2A-2C) may be aggregated into a single table. Furthermore, multiple devices (e.g., computers) that can communicate with each other via a network may share some of the functions of the registration process performed by the processing server and, as a whole, provide the functions of the registration process (a system equipped with these devices corresponds to a server). The various relationships (e.g., the relationship between the management identifier UID and the device identifier DID) may be indicated by multiple pieces of data. For example, relationships may be indicated by multiple pieces of data distributed across multiple devices.

In each of the above-described embodiment, modified embodiment and modifications, a part of the configuration realized by hardware may be replaced with software, or conversely, a part or all of the configuration realized by software may be replaced with hardware. For example, the function of generating the one-time code (S160) in FIG. 4 may be realized by a dedicated hardware circuit.

When some or all of the functions according to aspects of the present disclosures are realized by a computer program, the program can be provided in a form stored in a computer-readable recording medium (e.g., a non-transitory recording medium). The program may be used in the same or a different recording medium (computer-readable recording medium) as when provided. The term "computer-readable recording medium" is not necessarily limited to portable recording media such as memory cards and/or CD-ROMs, but can also include internal storage devices in computers, such as various ROMs, and external storage devices connected to the computer, such as hard disk drives.

The embodiment, modified embodiment and modifications described above are intended to facilitate understanding of aspects of the present disclosures and are not intended to limit the same. The aspects of the present disclosures may be changed and/or improved without departing from its intent, and the aspects of the present disclosures include equivalents thereof.

The technology disclosed above can be realized in various forms, such as a method of processing data and a device (e.g., a server) configured to process data, a computer program realizing the functions of the method or device, a recording medium containing such a computer program (e.g., a non-transitory computer-readable recording medium).

What is claimed is:

1. A server of a communication system, the communication system including an administrator's device, a terminal device and a communication device, the server comprising:
    a controller having hardware,
    wherein the server is communicable with each of the administrator's device, the terminal device and the communication device, and
    wherein the controller is configured to perform
        first obtaining a first request for information associated with an administrator of the communication device from the administrator's device,
        first transmitting management information associated with the administrator to a management device in response to the first request,
        second obtaining an information request for information to be used by the communication device from the communication device,
        second transmitting authentication information to use the communication device to the communication device;
        third obtaining the authentication information and the management information from the terminal device, the authentication information obtained from the terminal device being information transmitted by the terminal device based on the authentication information received by the communication device, the management information obtained from the terminal device being information to be transmitted by the terminal device based on the management information received by the management device; and
        first associating the management information obtained from the terminal device with identification information of the communication device.

2. The server according to claim 1, wherein the controller is further configured to perform fourth obtaining device information to be associated with the communication device from the terminal device, and
    wherein the first associating further associates the identification information of the communication device with the device information.

3. The server according to claim 2, wherein the device information contains a deliver destination of a consumable used by the communication device.

4. The server according to claim 2, wherein the second obtaining further obtains:
    first information request indicating a request for information to use the first communication device from the first communication device; and
    second information request indicating a request for information to use the second communication device from the second communication device,
    wherein the second transmitting further transmits:
    first authentication information to use the first communication device to the first communication device; and
    second authentication information to use the second communication device to the second communication device,
    wherein the third obtaining obtains:
    the first authentication information and the management information from the first terminal device, the first authentication information obtained from the first terminal device being information transmitted by the first terminal device based on the first authentication information received by the first communication device, the management information obtained from the first terminal device being information transmitted by the first terminal device based on the management information received by the administrator's device; and
    the second authentication information and the management information from the second terminal device, the second authentication information obtained from the second terminal device being information transmitted by the second terminal device based on the second authentication information received by the second communication device, the management information obtained from the second terminal device being information transmitted by the second terminal device based on the management information received by the administrator's device, and
    wherein the first associating associates:
    the management information obtained from the first terminal device with the first identification information of the first communication device; and
    the management information obtained from the second terminal device with the second identification information of the second communication device.

5. The server according to claim 1, wherein the communication device includes a print engine,
    wherein the second transmitting transmits data causing the print engine to print the authentication information to the communication device, and
    wherein the authentication information obtained from the terminal device indicates the authentication information to be input to the terminal device.

6. The server according to claim 1, wherein the controller is further configured to perform:
    determining a term for obtaining the authentication information from the terminal device;
    when the authentication information is obtained from the terminal device after the term, prohibiting association of the management information obtained from the terminal device with the identification information of the communication device; and
    when the authentication information is obtained from the terminal device before the term, allowing association of the management information obtained from the terminal device with the identification information of the communication device.

7. A server of a communication system, the communication system including an administrator's device, a terminal device, and a communication device, the server comprising:
a non-transitory computer-readable recording medium; and
a controller having hardware,
wherein the server is communicable with each of the administrator's device, the terminal device and the communication device,
wherein the recording medium contains computer-executable instructions which cause, when executed by the controller, the server to perform
first obtaining a first request for information associated with an administrator of the communication device from the administrator's device,
first transmitting management information associated with the administrator to a management device in response to the first request,
second obtaining an information request for information to be used by the communication device from the communication device,
second transmitting authentication information to use the communication device to the communication device,
third obtaining the authentication information and the management information from the terminal device, the authentication information obtained from the terminal device being information transmitted by the terminal device based on the authentication information received by the communication device, the management information obtained from the terminal device being information to be transmitted by the terminal device based on the management information received by the management device, and
first associating the management information obtained from the terminal device with identification information of the communication device.

* * * * *